US012115812B2

(12) United States Patent
Deng

(10) Patent No.: US 12,115,812 B2
(45) Date of Patent: Oct. 15, 2024

(54) PREPARATION PROCESS OF 3D TEXTURE DECORATIVE PANEL, AND PREPARATION SYSTEM THEREOF AS WELL AS 3D TEXTURE DECORATIVE PANEL PREPARED THEREFROM

(71) Applicant: Foshan Hope Digital Printing Equipment Co., Ltd., Foshan (CN)

(72) Inventor: Sheguang Deng, Foshan (CN)

(73) Assignee: Foshan Hope Digital Printing Equipment Co., Ltd., Foshan (CN)

( * ) Notice: Subject to any disclaimer, the term of this patent is extended or adjusted under 35 U.S.C. 154(b) by 556 days.

(21) Appl. No.: 17/331,009

(22) Filed: May 26, 2021

(65) Prior Publication Data

US 2022/0355613 A1 Nov. 10, 2022

(51) Int. Cl.

| | |
|---|---|
| ***B41M 3/06*** | (2006.01) |
| ***B41J 11/00*** | (2006.01) |
| ***B41M 7/00*** | (2006.01) |
| ***B44C 3/00*** | (2006.01) |
| ***B44C 5/04*** | (2006.01) |

(52) U.S. Cl.

CPC ......... *B44C 3/005* (2013.01); *B41J 11/00214* (2021.01); *B41M 3/06* (2013.01); *B41M 7/0081* (2013.01); *B44C 5/04* (2013.01)

(58) Field of Classification Search

CPC ................................... B41M 3/06; B44C 5/04
USPC .......................................................... 427/256
See application file for complete search history.

(56) References Cited

U.S. PATENT DOCUMENTS

| | | | | |
|---|---|---|---|---|
| 11,420,229 | B2 * | 8/2022 | Pankoke | B05D 7/584 |
| 2015/0030817 | A1 * | 1/2015 | Wiegelmann | B44F 9/02 427/256 |
| 2021/0394431 | A1 * | 12/2021 | Barberan Latorre | B05D 7/536 |

FOREIGN PATENT DOCUMENTS

| | | | | |
|---|---|---|---|---|
| CN | 109823071 | | 5/2019 | |
| CN | 109823071 A | * | 5/2019 | |
| CN | 110485663 A | * | 11/2019 | B44C 5/0461 |
| CN | 110485663 | | 4/2021 | |
| CN | 110485664 | | 4/2021 | |

OTHER PUBLICATIONS

Extended European Search Report, Application No. 21175027.8-1014, Jan. 7, 2022.

* cited by examiner

*Primary Examiner* — Cachet I Proctor
(74) *Attorney, Agent, or Firm* — David R. Stevens; Stevens Law Group

(57) ABSTRACT

A process includes printing a pattern on an upper surface of a substrate and curing to form a pattern layer; carrying out digital inkjet printing on an area where a convex pattern is required on the pattern layer by using a first UV varnish to obtain a first UV varnish layer, and before the first UV varnish layer is cured, in a crack area with a predetermined sharp boundary on the pattern layer, digital inkjet printing is performed on an edge of the first UV varnish layer with an ink to obtain an ink layer, the ink layer is in contact with the first UV varnish layer, then the first UV varnish layer is subjected to curing, the first UV varnish and ink being transparent or translucent; and removing the ink to obtain a 3D texture decorative panel with sharp edges.

10 Claims, 4 Drawing Sheets

PREPARATION PROCESS OF 3D TEXTURE DECORATIVE PANEL, AND PREPARATION SYSTEM THEREOF AS WELL AS 3D TEXTURE DECORATIVE PANEL PREPARED THEREFROM

TECHNICAL FIELD

The present invention relates to the technical field of preparing a decorative panel, in particular to a process for preparing a 3D texture decorative panel, a preparation system thereof and a decorative panel prepared therefrom.

BACKGROUND

In the decorative panel industry, 3D texture effect or the bumpy feel effect on the surface is currently achieved by the following two ways: 1. achieving a convex effect by printing and stacking; 2. applying a pressure to the plate by using a steel roller or steel plate with a convex pattern, thus achieving a concave crack effect. The first method requires a lot of coatings, and its effect is relatively blunt, and it is difficult to imitate the effect of real wood texture or stone texture. The cracks produced by the second method are more real, but it has high engraving requirements for steel rollers and steel plates; further, it is very difficult to prepare a steel roller or steel plate completely matches the pattern, and misalignment is easy to occur. The products prepared by the two methods have high repeatability, high texture repeatability, fuzzy texture edge, and soft hand feeling. However, it is impossible to achieve strong and sharp crack effect, even if the ink is piled up by 3D printing to achieve an accuracy texture correspondence, texture effect with clear corners and strong hand feeling can't be realized, which has a certain gap compared with the real hand feeling effect of wood or building materials.

SUMMARY

In view of the problems raised in the background, the present invention aims to provide a process for preparing a 3D texture decorative panel. The 3D texture decorative panel prepared by this process has clear textures, rich gradations, and strong texture effects. The process of the present invention can not only achieve crack effects, but also achieve embossing effects, and the combination of both the effects etc., and finally a highly simulated 3D texture effect can be obtained.

Another object of the present invention is to provide a decorative panel prepared by the above process for preparing a 3D texture decorative panel, in which cracked textures and raised embossment, etc. are formed. The obtained texture is three-dimensional and consistent with the pattern, achieving partial highly flexible and controllable 3D surface effect with higher simulation degree, and high-end decorative panels with stronger textures can be obtained.

Another object of the present invention is to provide a system using the above process for preparing a 3D texture decorative panel. The decorative panels with high simulation 3D texture effects prepared by this system do not need to be plated in advance, and the cracks formed are more stable and efficient. Further, the pattern of the cracks can be completely random and modified at any time, which has a high efficient production and is more suitable for industrial production.

For this purpose, the invention provides the following technical solutions:

A process for preparing a 3D texture decorative panel comprises the following steps:

step A, printing a pattern on an upper surface of a substrate and curing to form a pattern layer;

step B: carrying out digital inkjet printing on an area where a convex pattern is required on the pattern layer by using a first UV varnish to obtain a first UV varnish layer, and before the first UV varnish layer is cured, in a crack area with a predetermined sharp boundary on the pattern layer, digital inkjet printing is performed on an edge of the first UV varnish layer with an ink to obtain an ink layer, the ink layer is in contact with the first UV varnish layer, then the first UV varnish layer and the second UV varnish layer (if any) are subjected to curing, and the first UV varnish is an UV transparent varnish or an UV translucent varnish, and the ink is selected from an aqueous transparent ink or a second UV varnish, and the second UV varnish is different from the first UV varnish;

step C, removing the ink to obtain a 3D texture decorative panel with sharp edges.

Optionally, in the step B, the first UV varnish is irradiated and cured by an LED-UV lamp with a wavelength of 320-400 nm; and in the step C, said removing the ink is carried out by a means selected from evaporation, physical adsorption, wire drawing and dust removal.

Optionally, the aqueous transparent ink is heated and evaporated to remove water, or the water is removed by using a water-absorbing roller.

Optionally, a first UV varnish is used to carry out digital inkjet printing on an area where a convex pattern is required on the pattern layer, a printing amount of the printhead is controlled by software, wherein the printing amount of the first UV varnish is 1 g/m$^2$ to 500 g/m$^2$, preferably 30 g/m$^2$ to 150 g/m$^2$, and a coating thickness of the first UV varnish is 0 mm to 0.5 mm Optionally, the ink, the first UV varnish and the second UV varnish have a liquid surface tension of 10 mN/m to 40 mN/m, respectively.

Optionally, the ink, the first UV varnish and the second UV varnish have a liquid surface tension of 22 mN/m to 28 mN/m, respectively.

Optionally, the aqueous transparent ink is not dissolvable with the first UV varnish; and the aqueous transparent ink and the first UV varnish have a liquid surface tension of 10 mN/m to 40 mN/m, respectively, and a difference between the liquid surface tension of the aqueous transparent ink and the first UV varnish is 0 mN/m to 10 mN/m, preferably 0 mN/m to 5 mN/m.

Optionally, the first UV varnish and the second UV varnish have a liquid surface tension of 10 mN/m to 40 mN/m, respectively, and a difference between the liquid surface tension of the first UV varnish and the second UV varnish is 0 mN/m to 10 mN/m, preferably 0 mN/m to 5 mN/m, after curing, a hardness and strength of the second UV varnish is lower than that of the first UV varnish.

Optionally, in the step A, the ink for forming the pattern layer is an UV ink, a weak solvent ink, an aqueous ink or an oil ink;

Optionally, the substrate is one of an artificial panel, a wood grain panel, a PVC panel, a PP panel, a glass fiber panel, a dense panel, a particle panel, a plywood, a metal panel, a SPC decorative panel, a LVT decorative panel, a glass or a door.

Optionally, a step of adding a transparent functional coating on the pattern layer is further comprised between the step A and the step B, and the functional coating is a wear-resistant layer, a reinforcing layer or a high saturation layer.

Optionally, the wear-resistant layer is a UV wear-resistant layer or a PVC wear-resistant layer, and when the wear-resistant layer is a UV wear-resistant layer, the added wear-resistant layer is cured.

Optionally, the reinforcement layer is a facing mortar or a composite fiber.

Optionally, the high saturation layer is a high saturation UV paint layer which needs to be cured.

Optionally, a step D is further comprised, after said removing in the step C, a functional surface coating is coated onto the cured first UV varnish layer, and the functional surface coating is a scratch-resistant coating, a wear-resistant coating, an anti-fouling coating, a high-gloss coating, a fire-proof and heat-insulating coating or a matt coating.

Optionally, in the step B, before the first UV varnish layer is cured, the ink may also be used to carry out digital inkjet printing to print ink dots with controllable density and size on the surface of the first UV varnish layer, then the ink dots are removed in the step C.

Optionally, a decorative panel prepared by the process for preparing a 3D texture decorative panel is provided, comprises a substrate, a pattern layer and a first UV varnish layer, the pattern layer is disposed on an upper surface of the substrate, and a convex first UV varnish layer is formed in an area where a convex is required on an upper surface of the pattern layer, a crack area with a sharp boundary on the upper surface of the pattern layer is provided with a crack gap obtained after the ink layer is removed, a partial area of the pattern layer provided with the crack gap is consistent with an area on the pattern layer that needs to be cracked or sunk.

Optionally, an area with a predetermined sharp boundary formed on the upper surface of the pattern layer, and the included angle between the first UV varnish layer and the pattern layer is 70° to 110°.

Optionally, the decorative panel prepared by the process for preparing a 3D texture decorative panel further comprises a functional coating and a functional surface coating, the functional coating is formed between the pattern layer and the first UV varnish layer, and the functional surface coating is disposed on an upper surface of the first UV varnish layer and covers the functional coating; the functional coating is a wear-resistant layer, a reinforcement layer or a high-saturation layer, and the functional surface coating is a scratch-resistant coating, a wear-resistant coating, an anti-fouling coating, a high-gloss coating or a matt coating.

A system using the process for preparing a 3D texture decorative panel for preparing the decorative panel with edges having clear and sharp cracks, comprises a pattern digital inkjet printer, a 3D texture digital inkjet printer and a removing device from upstream to downstream, wherein the 3D texture digital inkjet printer is provided with a UV varnish printing module, an ink printing module and a UV varnish curing module sequentially from an input end to an output end;

the UV varnish curing module adopts an LED-UV lamp with a light wavelength of 320 nm to 400 nm, and removing device is selected from the group consisting of an evaporative water removing device and a physical adsorption water removing device, a wire-drawing device and a dust removal device.

Optionally, the removing device is an electric heating evaporator or a water suction roller.

Optionally, the system using the process for preparing a 3D texture decorative panel further comprises a functional coating machine and a functional surface coating machine, wherein, the functional coating machine is disposed between the pattern digital inkjet printer and the 3D texture digital inkjet printer, and an input end of the functional surface coating machine is connected with an output end of a water removing line; and both the functional coating machine and the functional surface coating machine are roll coating machines.

Compared with the prior art, the present invention has the following advantages:

1. The process for preparing a texture decorative panel with 3D texture effect adopts a way of digital inkjet printing, through the treatments of providing UV varnish and ink with similar liquid surface tension, followed by curing and removing water sequentially, a texture effect with strong hand feeling, sharp crack edge, clear edges and corners, real crack effect and rich texture elevation gradation, and coexisting crack and embossment is realized.

2. By carrying out digital inkjet printing on an area where a convex pattern is required on the pattern layer by using a UV varnish, and in a crack area with a predetermined sharp boundary on the pattern layer, digital inkjet printing is performed with an ink, the formed cracks are consistent with the pattern, thus achieving a 3D effect of higher simulation degree with different partial heights, or forming a larger depression area as needed and meanwhile a sharp or rounded crack, that is, a plentiful crack effects, thus avoiding the occurrence of cracks forming on areas that cracks are not required or predetermined. Meanwhile, inkjet printing is not performed where sharp edges are not required, so that there are sharp textures partially and rounded textures partially, thereby forming a highly simulated 3D texture effect.

3. Cracks are formed by digital inkjet printing without patternmaking in advance, and the cracks formed are more stable and efficient. Further, the pattern of the cracks can be completely random and modified at any time, which has a high efficient production and is more suitable for industrial production.

4. The 3D texture decorative panel prepared by the process of the present application has very rich 3D stereoscopic effects. The height of 3D texture can be flexibly adjusted within 0 mm to 0.5 mm. There are partial 3D effects of different heights on the same surface at the same time, which can be matched with patterns, and resulting panel surface has a high degree of simulation. In addition, due to the combination of an aqueous transparent ink or second UV varnish, sharp textures and round textures can be formed at the same time, which is extremely controllable. Sharp textures can be used for patterns such as wood grain and/or wood thorn texture, marble cracks, etc., and the rounded texture can be used for patterns such as embossment, oil painting, leather texture, sandstone, etc., combining with the design, the surface texture can achieve confused as real ones.

5. In the step B of this application, before the first UV varnish layer is cured, the ink can also be used to carry out digital inkjet printing to print ink dots with controllable density and size on the surface of the first UV varnish layer, then the ink dots are removed in the step C. By controlling the size and density of the ink dots, a diffuse reflection effect with different partial glossiness is produced, and the rich 3D texture effect on the surface of the decorative panel is significantly improved. The local gloss adjustment process can digitally adjust the gloss of the 3D effect surface (there is only one kind of gloss, usually high gloss, before adjusting), and the gloss can be flexibly adjusted in the range of 5° to 80°, thus forming an effect that cannot be achieved by traditional process or other processes. It has not only a sense of touch, but also a visual texture.

BRIEF DESCRIPTION

The accompanying drawings further illustrate the present invention, but the content in the accompanying drawings does not constitute any limitation to the present invention.

REFERENCE NUMBERS

1—substrate; 2—pattern layer; 3—UV transparent varnish layer; 4—aqueous transparent ink layer; 5—functional coating; 6—functional surface coating; 7—pattern digital inkjet printer; 8—3D texture digital inkjet printer; 81—UV varnish printing module; 82—aqueous transparent ink printing module; 83—UV varnish curing module; 9—water removing line.

DETAILED EMBODIMENTS

The technical solutions of specific embodiments of the present invention will be further described in detail hereinafter with reference to the accompanying drawings, but the present invention is not limited to the following embodiments.

Figure 1:
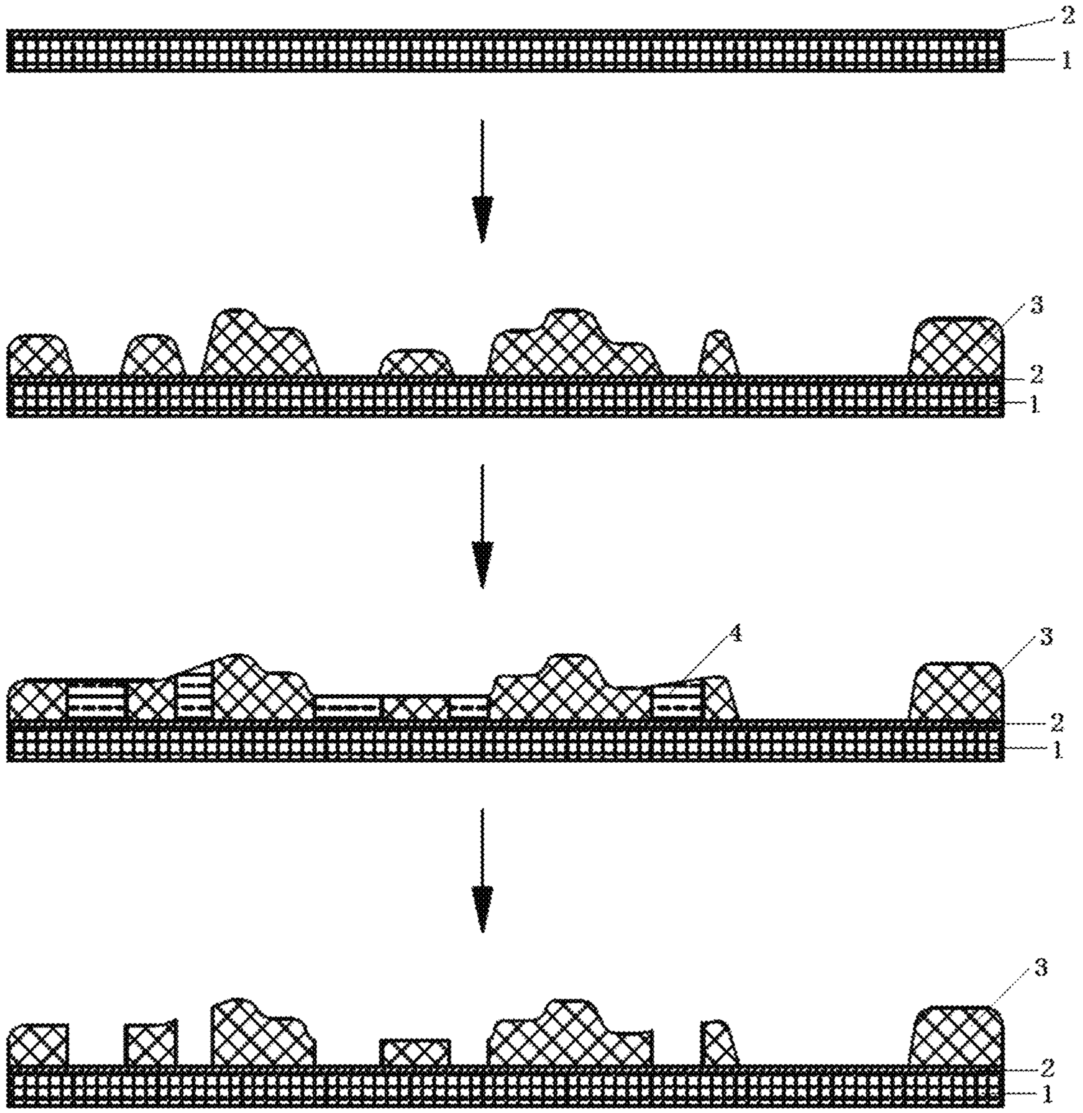
FIG. 1 is a schematic diagram of a process for preparing a 3D texture decorative panel provided in an embodiment of the present invention.

As shown in FIG. 1, a process for preparing a 3D texture decorative panel, comprises the following steps:

step A, printing a pattern on an upper surface of a substrate 1 and curing to form a pattern layer 2; optionally, a pattern layer 2 can also be formed by traditional printing and curing;

step B: carrying out digital inkjet printing on an area where a convex pattern is required on the pattern layer 2 by using an UV transparent varnish to obtain an UV transparent varnish layer 3, and before the first UV varnish layer is cured, in a crack area with a predetermined sharp boundary on the pattern layer 2, digital inkjet printing is performed on an edge of the UV varnish layer with an aqueous transparent ink to obtain an aqueous transparent ink layer 4, the aqueous transparent ink is in contact with the UV transparent varnish, then the UV transparent varnish is subjected to curing. Meanwhile, inkjet printing is not performed where sharp edges are not required, so that there are sharp textures partially and rounded textures partially. The aqueous transparent ink is not dissolvable with the UV transparent varnish. The aqueous transparent ink and the UV transparent varnish have a liquid surface tension of 10 mN/m to 40 mN/m, respectively, and a difference between the liquid surface tension of the aqueous transparent ink and the first UV transparent varnish is 0 mN/m to 10 mN/m, preferably 0 mN/m to 5 N/m.

Step C, removing the aqueous transparent ink to obtain a texture decorative panel with sharp cracks on the surface.

The process for preparing a texture decorative panel with 3D texture effect adopts a way of digital inkjet printing, through the treatments of providing UV transparent varnish and aqueous transparent ink with similar liquid surface tension, followed by curing and removing water sequentially, a texture effect with strong hand feeling, sharp crack edge, clear edges and corners, real crack effect and rich texture elevation gradation, and coexisting crack and embossment is realized. By carrying out digital inkjet printing on a crack area with a sharp boundary is required on the pattern layer by using a UV transparent varnish and an aqueous transparent ink, the formed cracks are consistent with the pattern, and a larger area of depression cracks can be formed as needed, thus avoiding the occurrence of cracks forming on areas that cracks are not required. Cracks are formed by digital inkjet printing without patternmaking in advance, and the cracks formed are more stable and efficient. Further, the pattern of the cracks can be completely random and modified at any time, which has a high efficient production and is more suitable for industrial production.

Optionally, in the step B, the first UV varnish is irradiated and cured by an LED-UV lamp with a wavelength of 320-400 nm, and in the step C, said removing the aqueous transparent ink namely water removing is carried out by evaporation or physical adsorption.

Optionally, the aqueous transparent ink is heated and evaporated to remove water or removed by using a water-absorbing roller.

Since the aqueous transparent ink cannot be cured under the irradiation conditions of a LED-UV lamp, when the UV transparent varnish is cured, the aqueous transparent ink remains in a liquid state, so that the UV transparent varnish printed by inkjet printing is cured firstly into a UV transparent varnish layer with sharp corners under the action of liquid surface tension, and then the aqueous transparent ink is subjected to water removing, so that a strong and sharp crack effect can be obtained. The UV transparent varnish and the aqueous transparent ink are mutually independent in the processes of curing and water removing respectively, so that the problems of deviation, shrinkage or re-cracking of cracks during the curing process can be avoided, and the crack effect is good.

Optionally, in the carrying out digital inkjet printing on different areas where a convex pattern is required on the pattern layer by using UV transparent varnish of the step B, different printing amounts of the printhead are controlled by software, wherein the printing amount of the UV transparent varnish is 1 g/m$^2$ to 500 g/m$^2$, preferably 30 g/m$^2$ to 150 g/m$^2$, and a coating thickness of the UV transparent varnish is 0 mm to 0.5 mm.

Digital inkjet printing is carried out by using UV transparent varnish with different printing amounts in different convex areas, and the coating thickness is different, which can obtain uneven convex patterns on the surface, and the obtained cracks are highly random, which can realize 3D surface effect with higher simulation degree and different partial heights, and can also realize large-area depression effect, thus obtaining high-end decorative panels with stronger textures.

Optionally, the transparent ink and the transparent UV varnish have a liquid surface tension of 10 mN/m to 40 mN/m, respectively.

Optionally, the transparent ink and the transparent UV varnish have a liquid surface tension of 22 mN/m to 28 mN/m, respectively.

The principle of forming crack is as follows: due to the liquid surface tension, when only UV transparent varnish is printed in step B, the surface edge of the formed UV transparent varnish layer is in an arc corner state, and if the UV varnish is cured at this time, the texture formed is soft, and the strong and sharp crack effect cannot be achieved. According to the present invention, the UV transparent varnish is ink-jet printed, and when the UV transparent varnish is not cured, digital ink-jet printing is carried out with aqueous transparent ink in the area where sharp boundary needs to be formed, since the UV transparent varnish and the aqueous transparent ink has similar liquid surface tension at this time, and the UV transparent varnish (oily) and the aqueous transparent ink (aqueous) is not dissolvable with each other, and the liquids are pulled to balance each other, which will lead to sharp edge of UV transparent varnish. If the UV transparent varnish is subjected to curing at this time, a crack effect with strong hand feeling will be formed. However, since the curing process cannot change the state of the aqueous transparent ink, good texture effect can be formed after the aqueous transparent ink is subjected to water removing in the later stage, and the problem of deviation or shrinkage of cracks during the curing process can be avoided. The aqueous transparent ink is the existing ink available in the market, and the liquid surface tension of the UV transparent varnish needs to reach the above range, and the UV transparent varnish needs to be cured first and then subjected to water removing. Meanwhile, ink-jet printing is not carried out at places where sharp edges are not needed, thereby forming a 3D texture effect with a sharp texture partially and a rounded texture partially of high simulation degree.

Optionally, in the step A, the ink for forming the pattern layer 2 is an UV ink, a weak solvent ink, an aqueous ink or an oil ink.

The substrate 1 is one of an artificial panel, a wood grain panel, a PVC panel, a PP panel, a glass fiber panel, a dense panel, a particle panel, a plywood, a metal panel, a SPC decorative panel, a LVT decorative panel, a glass or a door Optionally, the ink for the pattern layer 2 is an UV ink.

The ink for the pattern layer can be selected from a UV ink, a weak solvent ink, an aqueous ink or an oil ink conventionally in the market, and the substrate can be selected from an artificial panel, a wood grain panel, a PVC panel, etc., the process for preparing digital crack effect of decorative panel has a wide application range.

Optionally, a step of adding a transparent functional coating 5 on the pattern layer 2 is further comprised between the step A and the step B, and the functional coating 5 is a wear-resistant layer, a reinforcing layer or a high saturation layer.

Optionally, the wear-resistant layer 5 is a UV wear-resistant layer or a PVC wear-resistant layer, and when the wear-resistant layer 5 is a UV wear-resistant layer, the added wear-resistant layer 5 is cured.

Optionally, the reinforcement layer 5 is a facing mortar or a composite fiber.

Optionally, the high saturation layer 5 is a high saturation UV paint layer, which can cure the added high-saturation layer 5.

By adding functional coating, the wear-resistance, strength and saturation of the finished decorative panel can be improved, thus improving the overall performance and practicability of the decorative panel.

Optionally, the process for preparing a decorative panel with digital crack effect further comprises a step D, after said removing in the step C, a functional surface coating 6 is coated onto the cured UV varnish layer 3, and the functional surface coating 6 is a scratch-resistant coating, a wear-resistant coating, an anti-fouling coating, a high-gloss coating, a fire-proof and heat-insulating coating or a matt coating.

Different functional surface coatings 6, such as a scratch-resistant coating, a wear-resistant coating, an anti-fouling coating, a high-gloss coating, a fire-proof and heat-insulating coating or a matt coating, can be added to the UV transparent varnish layer after removing water treatment as required, which can improve the functional richness of the decorative panel surface and improve the surface performance and practicability of the decorative panel.

Figure 2:
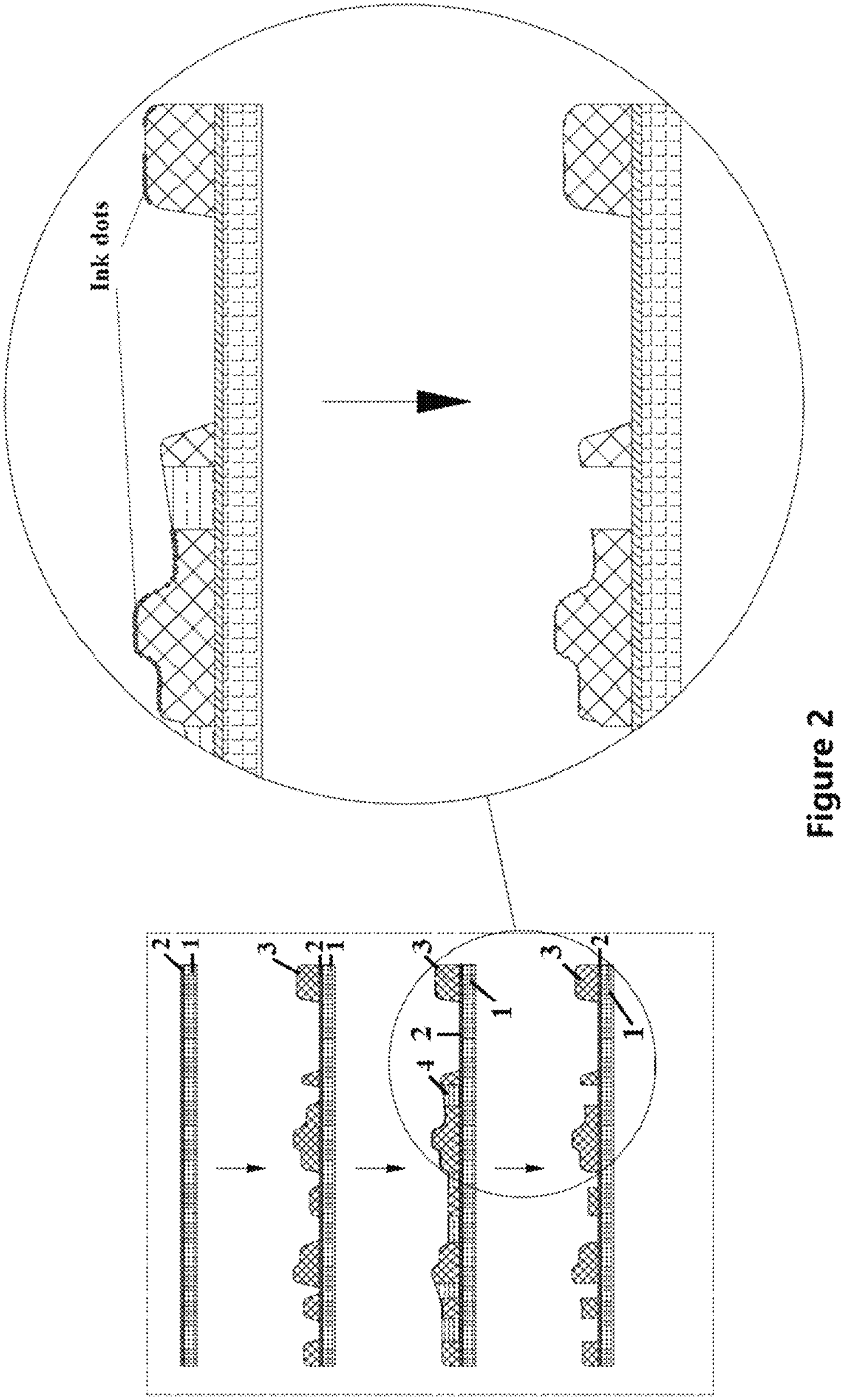
FIG. 2 is a schematic diagram of a process for preparing a decorative panel with digital crack effect provided in another embodiment of the present invention.

As shown in FIG. 2, in the step B, before the UV transparent varnish layer is cured, the aqueous transparent ink may also be used to carry out digital inkjet printing to print ink dots with controllable density and size on the surface of the UV transparent varnish layer, then the ink dots are removed in the step C. By controlling the size and density of the ink dots, a diffuse reflection effect with different partial glossiness is produced, and the rich 3D texture effect on the surface of the decorative panel is significantly improved.

When printing ink dots with controllable density and size by using aqueous transparent ink on the surface of the uncured first UV transparent varnish layer, shapes of small dots can be pressed on the surface of the first UV transparent varnish. After the first UV varnish is cured and the aqueous transparent ink is removed, concave dot-shape will be left on the surface of the first UV varnish. By matching the size and density of the dots, the surface of the first UV varnish that may originally carried out specular reflection will form an uneven surface structure, thus forming a diffuse reflection effect and reducing the glossiness of the first UV varnish surface, and forming a partial matte effect.

Figure 3:
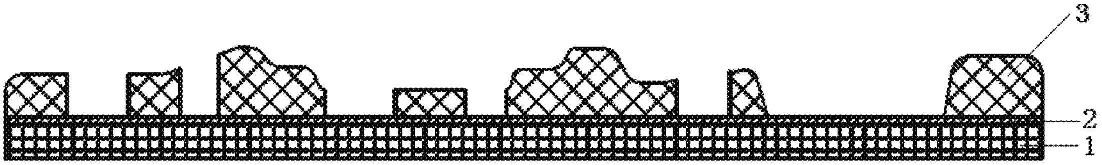
FIG. 3 is a schematic structural diagram of a decorative panel provided in an embodiment of the present invention.

As shown in FIG. 3, a decorative panel prepared by the process for preparing a 3D texture decorative panel comprises a substrate 1, a pattern layer 2 and an UV transparent varnish layer 3, the pattern layer 2 is disposed on an upper surface of the substrate 1, and a convex UV transparent varnish layer 3 is formed in an area where a convex is required on an upper surface of the pattern layer 2, a crack area with a sharp boundary on the upper surface of the pattern layer 2 is provided with a crack gap obtained after the aqueous transparent ink layer 4 is removed, a partial area of the pattern layer 2 provided with the crack gap is consistent with an area on the pattern layer 2 that needs to be cracked or sunk.

Optionally, an area with a sharp boundary needs to be formed on the upper surface of the pattern layer 2, and the included angle between the UV transparent varnish layer 3 and the pattern layer 2 is 70° to 110°.

In the decorative panel of the present application, cracked or sunken cracks are formed on the pattern layer 2, and the formed cracks are stereoscopic and highly simulated, and correspond to the pattern, thus avoiding the problem that cracks forming on areas that cracks are not required, while the areas where sharp boundaries need to be formed have obvious and sharp crack corners. When the UV transparent varnish and the aqueous transparent ink has similar liquid surface tension, and the UV transparent varnish (oily) and the aqueous transparent ink (aqueous) is not dissolvable with each other, since the liquids are pulled to balance each other, which will lead to sharp edge of UV transparent varnish, and crack areas with sharp boundaries will need to be formed on the upper surface of the pattern layer 2. If the UV transparent varnish is cured at this time, a cracking effect with a strong hand feeling will be formed, and the cracks are sharp and rounded, and the crack effects are rich.

Figure 4:
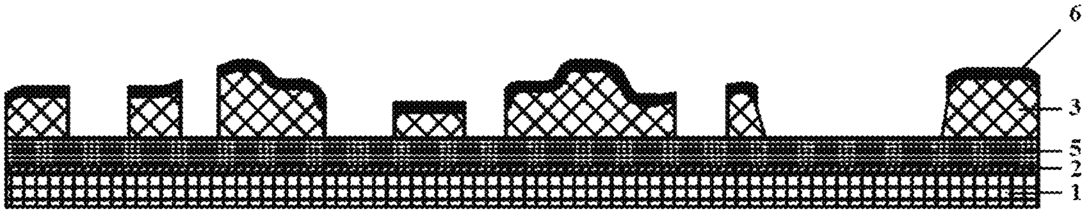
FIG. 4 is an optimized schematic structural diagram of a decorative panel provided in another embodiment of the present invention.

As shown in FIG. 4, optionally, the decorative panel prepared by the process for preparing a 3D texture decorative panel further comprises a functional coating 5 and a functional surface coating 6, the functional coating 5 is formed between the pattern layer 2 and the UV transparent varnish layer 3, and the functional surface coating 6 is disposed on an upper surface of the UV transparent varnish layer 3 and covers the functional coating 5. The functional coating 5 is a wear-resistant layer, a reinforcement layer or a high-saturation layer, and the functional surface coating 6 is a scratch-resistant coating, a wear-resistant coating, an anti-fouling coating, a high-gloss coating or a matt coating.

The decorative panel prepared by the process for preparing a decorative panel with digital crack effect has real cracks, and the texture formed by cracks is random, and the texture and patterns can correspond to each other. The added functional coating and the functional surface coating effectively improve the overall performance and surface performance of the decorative panel, and improves the practicability of the decorative panel.

Figure 5:
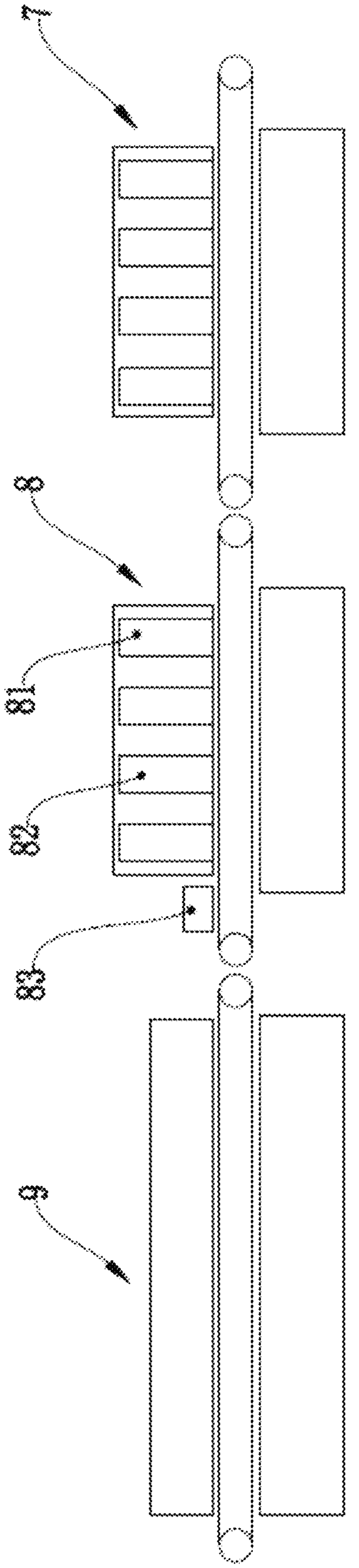
FIG. 5 is a schematic structural diagram of a preparation system provided in an embodiment of the present invention.

As shown in FIG. 5, a system using the process for preparing a 3D texture decorative panel for preparing the decorative panel with edges having clear and sharp cracks, comprises a pattern digital inkjet printer 7, a 3D texture digital inkjet printer 8 and a water removing line 9 from upstream to downstream, wherein the 3D texture digital inkjet printer 8 is provided with an UV varnish printing module 81, an aqueous transparent ink printing module 82 and a UV varnish curing module 83 sequentially from an input end to an output end.

The UV varnish curing module adopts an LED-UV lamp with a light wavelength of 320 nm to 400 nm, and the water removing line 9 is an evaporative water removing device or a physical adsorption water removing device.

Optionally, the water removing line 9 is an electric heating evaporator or a water suction roller.

The preparation system firstly prints a pattern on an upper surface of substrate 1 through a pattern digital inkjet printer 7, which is cured to form a pattern layer 2. Then, the substrate 1 is transported to a 3D texture digital inkjet printer 8, wherein, an area where a convex pattern is required on the pattern layer 2 is subjected to digital inkjet printing by using an UV transparent varnish through an UV varnish printing module 81, and a crack area where a sharp boundary is required on the pattern layer 2 is subjected to digital inkjet printing by using an aqueous transparent ink through an aqueous transparent ink printing module 82, and the UV transparent varnish is not cured at this time. Then UV varnish curing module 83 arranged at the output end of the 3D texture digital inkjet printer 8 immediately carries out curing to the UV transparent varnish layer. Finally, the substrate 1 is transported to a water removing line 9, and the aqueous transparent ink is cured to form a crack effect of cracking or sag on the surface of the pattern layer 2. Cracks are formed by digital inkjet printing using the 3D texture digital inkjet printer 8 without patternmaking in advance, and the cracks formed are more stable and efficient. Further, the pattern of the cracks can be completely random and modified at any time, which has a high efficient production and is more suitable for industrial production. The preparation system adopts a digital inkjet printing to print crack ink, through the treatments of providing UV transparent varnish and aqueous transparent ink with similar liquid surface tension, followed by curing and removing water sequentially, so that cracked or sunken cracks can be formed on the pattern layer 2, thus forming a texture effect with strong hand feeling, sharp crack edge, clear edges and corners, and real 3D crack effect.

Optionally, the system using the process for preparing a 3D texture decorative panel further comprises a functional coating machine and a functional surface coating machine, wherein, the functional coating machine is disposed between the pattern digital inkjet printer 7 and the 3D texture digital inkjet printer 8, and an input end of the functional surface coating machine is connected with an output end of a water removing line 9; and both the functional coating machine and the functional surface coating machine are roll coating machines.

By adding a transparent functional coating 5 on the pattern layer 2 through the functional coating machine, the overall performance such as wear-resistance, strength and saturation of the decorative panel can be improved. After curing and removing treatment, by coating a functional surface coating 6 onto cured UV transparent varnish layer 3 through a functional surface coating machine, the functional richness of the decorative panel surface is improved, and the surface performance and practicability of the decorative panel are also improved.

When compared with the above embodiments, difference lies in that: step B is as follows: carrying out digital inkjet printing on an area where a convex pattern is required on the pattern layer 2 by using a first UV transparent varnish to obtain a first UV transparent varnish layer, and when the first UV transparent varnish layer is not cured, it is necessary to form a crack area with a sharp boundary on the pattern layer 2, then digital inkjet printing is performed on an edge of the first UV transparent varnish layer with a second UV transparent varnish to obtain a second UV transparent ink layer, then the first UV transparent ink layer and the second UV transparent varnish layer are subjected to curing. The first UV transparent varnish and the second UV transparent varnish have a liquid surface tension of 10 mN/m to 40 mN/m, respectively, and a difference between the liquid surface tension of the first UV transparent varnish and the second UV transparent varnish is 0 mN/m to 10 mN/m, preferably 0 mN/m to 5 N/m. After curing, the hardness and strength of the second UV varnish are lower than that of the first UV varnish. Then in the step C, the second UV transparent varnish is subjected to removing by a wire-drawing device and a dust removal device to obtain a 3D texture decorative panel edges having clear and sharp cracks.

The inventor found that the liquid tensions of the first UV varnish and the second UV varnish are similar or the same, so they will not spread into each other much after printing, and the strength of the first UV varnish is much higher than that of the second UV varnish after curing, and a partial softening effect is formed after curing. After treating in the following wire-drawing device and the corresponding dust removal device, the softened part is removed, and the remaining first UV varnish has edges having clear and sharp cracks.

When printing dots with controllable density and size with the second UV varnish on the surface of the uncured first UV transparent varnish layer, shapes of small dots can be pressed on the surface of the first UV transparent varnish. After the first UV varnish is cured and the aqueous transparent ink is removed, concave dot-shape will be left on the surface of the first UV varnish. By matching the size and density of the dots, the surface of the first UV varnish that is originally carried out specular reflection will form an uneven surface structure, thus forming a diffuse reflection effect and reducing the glossiness of the first UV varnish surface, and forming a partial matte effect.

The technical principle of the present invention has been described above in combination with specific embodiments. These descriptions are only for the purpose of explaining the principles of the present invention, and cannot be interpreted as limiting the scope of protection of the present invention in any way. Based on this explanation, all other embodiments obtained by one of ordinary skill in the art without creative work are within the scope of protection of the present invention.

The invention claimed is:

1. A process for preparing a 3D texture decorative panel, comprising the following steps:

step A, printing a pattern on an upper surface of a substrate and curing to form a pattern layer;

step B: carrying out digital inkjet printing on an area where a convex pattern is required on the pattern layer by using a first UV varnish to obtain a first UV varnish layer, and before the first UV varnish layer is cured, in a crack area with a predetermined sharp boundary on the pattern layer, digital inkjet printing is performed on an edge of the first UV varnish layer with an ink to obtain an ink layer, the ink layer is in contact with the first UV varnish layer, then the first UV varnish layer is subjected to curing, and the first UV varnish is an UV transparent varnish or an UV translucent varnish, and the ink is selected from an aqueous transparent ink or a second UV varnish, and the second UV varnish is different from the first UV varnish; and step C, removing the ink to obtain a 3D texture decorative panel with sharp edges, wherein, the aqueous transparent ink is not dissolvable with the first UV varnish; and wherein the aqueous transparent ink and the first UV varnish have a liquid surface tension of 10 mN/m to 40 mN/m, respectively, and a difference between the liquid surface tension of the aqueous transparent ink and the first UV varnish is 0 mN/m to 10 mN/m.

2. The process of claim 1, wherein, in the step B, the first UV varnish is irradiated and cured by an LED-UV lamp with a wavelength of 320-400 nm; and wherein in the step C, said removing the ink is carried out by a means selected from evaporation, physical adsorption, a wire drawing and a dust removal.

3. The process of claim 1, wherein, in the carrying out digital inkjet printing on an area where a convex pattern is required on the pattern layer by using a first UV varnish of the step B, a printing amount of the printhead is controlled by software, wherein the printing amount of the first UV varnish is 1 $g/m^2$ to 500 $g/m^2$, and a coating thickness of the first UV varnish is 0 mm to 0.5 mm.

4. The process of claim 3, wherein, in the step B, the printing amount of the first UV varnish is 30 $g/m^2$ to 150 $g/m^2$.

5. The process of claim 1, wherein, a difference between the liquid surface tension of the aqueous transparent ink and the first UV varnish is 0 mN/m to 5 mN/m.

6. The process of claim 1, wherein, the first UV varnish and the second UV varnish have a liquid surface tension of 10 mN/m to 40 mN/m, respectively, and after curing, a hardness and strength of the second UV varnish is lower than that of the first UV varnish.

7. The process of claim 6, wherein, a difference between the liquid surface tension of the second UV varnish and the first UV varnish is 0 mN/m to 5 mN/m.

8. The process of claim 1, further comprising a step of adding a transparent functional coating on the pattern layer between the step A and the step B, and the functional coating is a wear-resistant layer, a reinforcing layer or a UV paint layer.

9. The process of claim 1, further comprising a step D, after said removing in the step C, a functional surface coating is coated onto the cured first UV varnish layer, and the functional surface coating is a scratch-resistant coating, a wear-resistant coating, an anti-fouling coating, a high-gloss coating, a fire-proof and heat-insulating coating or a matt coating.

10. The process of claim 1, in the step B, before the first UV varnish layer is cured, the ink may also be used to carry out digital inkjet printing on the surface of the first UV varnish layer.

* * * * *